(No Model.)

3 Sheets—Sheet 1.

T. BÖHM & L. EICHELBERG.
COMBINED SHOE OR BOOT SCRAPER AND BELL PULL.

No. 410,633.   Patented Sept. 10, 1889.

Witnesses:

Inventors:
T. Böhm &
L. Eichelberg
by their attorneys
Roeder & Briesen (No Model.) 3 Sheets—Sheet 2.
T. BÖHM & L. EICHELBERG.
COMBINED SHOE OR BOOT SCRAPER AND BELL PULL.
No. 410,633. Patented Sept. 10, 1889.
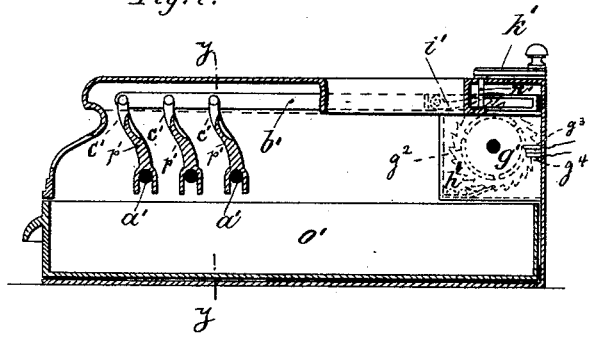
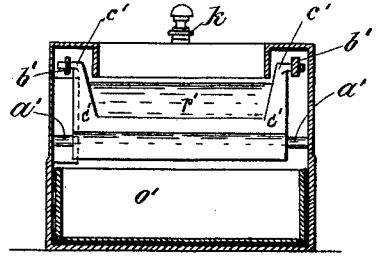
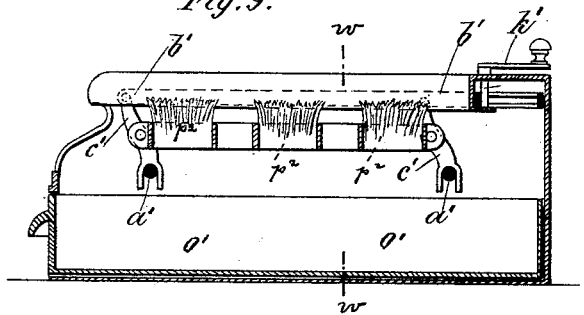
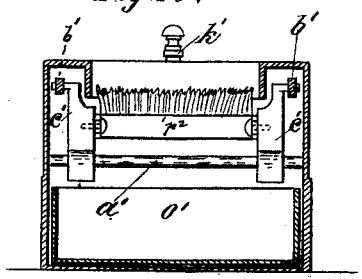
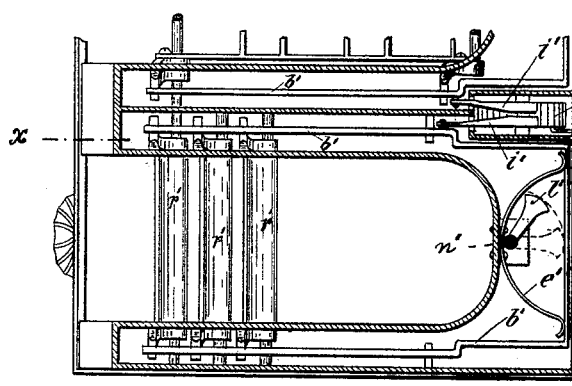
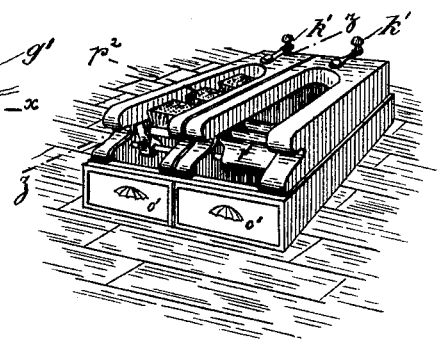
Witnesses:
Wm Wagner
A Jonghmans
Inventors:
T. Böhm &
L. Eichelberg
by their attorneys
Roeder & Briesen
N. PETERS, Photo-Lithographer, Washington, D. C.

(No Model.)  3 Sheets—Sheet 3.
T. BÖHM & L. EICHELBERG.
COMBINED SHOE OR BOOT SCRAPER AND BELL PULL.
No. 410,633. Patented Sept. 10, 1889.
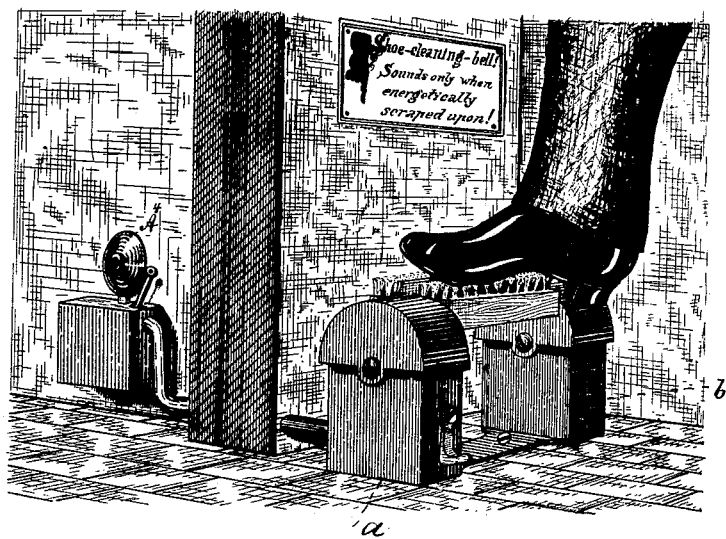
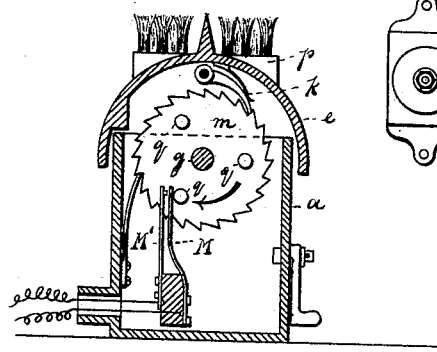
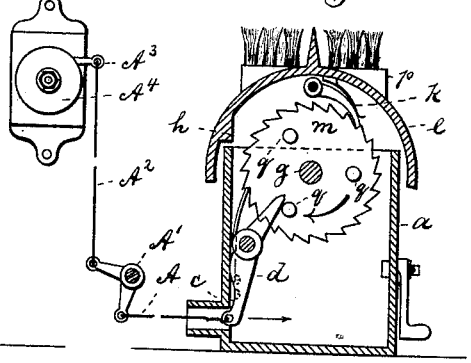
Witnesses:
Wm. Wagner
A. Jonghmans
Inventors:
T. Böhm &
L. Eichelberg, per
Roeder & Briesen attys

UNITED STATES PATENT OFFICE.

THEODOR BÖHM AND LEOPOLD EICHELBERG, OF BERLIN, GERMANY.

COMBINED SHOE OR BOOT SCRAPER AND BELL-PULL.

SPECIFICATION forming part of Letters Patent No. 410,633, dated September 10, 1889.

Application filed February 5, 1889. Serial No. 298,715. (No model.)

*To all whom it may concern:*

Be it known that we, THEODOR BÖHM and LEOPOLD EICHELBERG, both subjects of the King of Prussia, residing at Berlin, in the Kingdom of Prussia, Germany, have invented new and useful Improvements in Combined Shoe or Boot Scraper and Bell-Pull, of which the following is a specification.

This invention relates to an improved shoe or boot cleaning device combined with bell-ropes, bell-pulls, or electro-magnetical ringing apparatus. The scrapers or brushes when used will cause the bell or ringing apparatus to sound. As there should be no other means for ringing the bell, any person wishing to enter the house or room is obliged to make use of the scraper.

The construction of our apparatus may be carried out in various ways, according to whether it is to be applied in the open air or to floors. So, also, will the construction vary with the form of scraper or brush used.

The invention consists in the various features of improvement, more fully pointed out in the claim.

Figure 1:
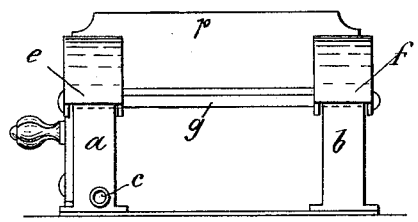
Figure 2:
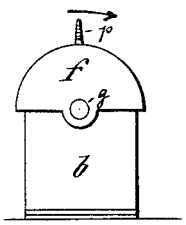
Figure 3:
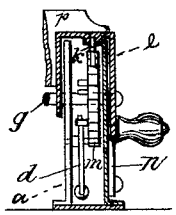
Figure 4:
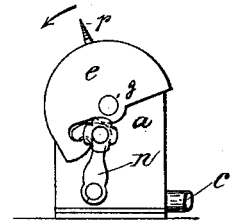
Figure 5:
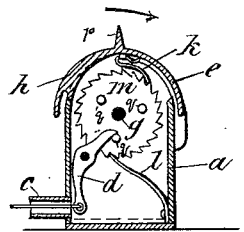
Figure 6:
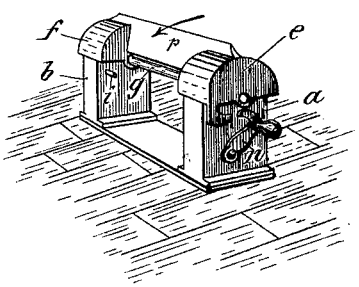

In the accompanying drawings, Figure 1 is a rear view of our improved scraper. Fig. 2 is an end view thereof. Fig. 3 is a sectional face view of box $a$, with front plate broken away; Fig. 4, an end view of Fig. 1 from opposite end of Fig. 2; Fig. 5, an end view of box $a$, with side plate removed. Fig. 6 is a perspective view of the scraper. Fig. 7 is a longitudinal section of a modification on line $xx$, Fig. 11; Fig. 8, a cross-section on line $yy$, Fig. 7; Fig. 9, a longitudinal section on line $zz$, Fig. 12. Fig. 10 is a cross-section on line $ww$, Fig. 9; Fig. 11, a sectional top view of the right half of the apparatus, and Fig. 12 a perspective view of the complete apparatus. Fig. 13 is a perspective view of the scraper shown in Fig. 1, showing it connected to the bell. Fig. 14 is an end view thereof with side plate removed; Fig. 15, an end view of the scraper, showing the electric connection.

With particular reference to Figs. 1 to 6 and Figs. 13 and 14 the bell-wire A is introduced into an opening $c$ in the back of the apparatus, where it is tightly stretched and fastened to one of the arms of a lever $d$. The other end of wire A is secured to bell-crank $A'$, which in turn connects by wire $A^2$ with spring-hammer $A^3$ of a bell $A^4$, as usual.

The scraping iron or brush $p$ is firmly connected to two half-cylindrically-shaped caps $e$ and $f$, extending over the two boxes $a$ and $b$, open at their top and with which they are connected by a shaft $g$ in such a manner as to be capable of revolving. In making use of the apparatus—*i. e.*, in passing the foot over the scraper in the direction shown by the arrow—the iron $p$ follows the foot.

The motion is limited in one direction by the re-enforcement $h$, cast on the inside of the caps $e$ and $f$, Fig. 5, and in the other direction by pin $i$, fixed to box $b$, Fig. 6. The re-enforcement $h$ has, furthermore, for its object to replace by its overweight the scraping-iron automatically into its ordinary upright position as soon as the shoe-sole has been withdrawn.

The cap $e$, moved in the direction of the foot and then falling back, turns at each motion by a pawl $k$ the ratchet-wheel $m$ (which is provided with the click $l$) one tooth forward. Pins $q$, projecting from the face of wheel $m$, vibrate the lever $d$, and the latter pulls the bell-wire. In the construction shown in the drawings the wheel $m$, which is provided with twenty-four teeth, has three pins $q$ arranged at equal distances from each other, so that the bell is caused to sound as often as eight scraping movements have been effected.

During the night it is often desirable that the bell be prevented from sounding—when, for instance, a lodger has his night-key. The movable latch $n$, engaging a hook on box $e$, (see Figs. 4 and 6,) serves for holding the scraper in its oblique end position, so that it can be used without causing the bell to sound.

With particular reference to Figs. 7 to 12, a double apparatus is shown, the right-hand side, Fig. 12, being provided with scraping-irons and the left-hand side with cleaning-brushes. Each of these two contrivances may of course be separately used. The scraping-irons $p'$ (the number of which is three in the apparatus shown in the drawings) are secured to levers $c'$. These levers are bifurcated to straddle their pivots $a'$. Each lever $c'$ engages a slide $b'$, as shown. The brushes $p^2$ of the adjoining apparatus are secured to similar levers $c'$, straddling pins $a'$ and engaging slide $b'$.

In using the apparatus the brushes or scrapers follow the foot until the slide $b'$ strikes the front wall of the casing, where the required resistance is offered to the foot. As soon as the foot is raised, the frame $b'$, when in its most rearward position, is thrown forward by a spring $e'$.

All the movable parts of the mechanism are protected by their shape and the overhanging parts of the casing against clogging. The dirt falling down is collected in a box $o'$, which may be drawn out.

A box containing a ratchet-wheel $g'$ and a click $h'$ is inserted between the two sections of the apparatus. The box is open on top, so that a pawl $i'$, pivoted to slide $b'$, turns the ratchet-wheel one tooth forward during each motion of the slide. In the construction shown in the drawings one box is arranged between the two apparatuses, and a pawl $i'$ is secured to the slide $b'$ of each cleaning device. The ratchet-wheel common to both apparatuses will therefore revolve indifferently either if the scrapers or if the brushes be used.

In this construction it has been assumed that an electric circuit is employed. The ratchet-wheel, made of brass, is provided with an annular insulating-piece of ebonite $g^2$, inserted therein and upon which slides a spring $g^3$, which is connected to one of the wires, the other wire $g^4$ sliding upon the ratchet-wheel itself. As soon as the spring $g^3$ enters into contact with the interruptions or breaks arranged in the ebonite piece $g^2$, the circuit will be closed by the metallic body of the wheel. The number of the interruptions in the ebonite (three interruptions are shown in Fig. 7 of the drawings) determines how often the bell will sound.

The temporary locking of the apparatus is obtained by turning the crank $k'$ around its vertical shaft $n'$. As long as the arm $k'$ is in its straight backward position, Fig. 7, an arm $l'$, carried by the shaft $n'$, is in the position shown by full lines in Fig. 11, and will allow the slide $b'$ to move freely; but when the crank $k'$ is turned to the right the arm $l'$ will be brought into the position shown in dotted lines, Fig. 11, and will lock the slide $b'$ tightly against the frame, so as to prevent any movement of the latter and of the ratchet-wheel. The crank $k'$ can easily be operated by the foot.

The number of the scraping-irons and the shape and sharpness of the edges of the scrapers may be varied at will.

In Fig. 15 the stops $q$ on the ratchet-wheel $m$ (shown in Fig. 14) cause the springs M M' to make contact by pressing against spring M. Thus an electric circuit is established and the bell is caused to ring. A further rotation of the ratchet-wheel causes the stop to clear the springs, and the latter will automatically separate.

We claim as our invention—

The combination of a frame with a scraper pivotally connected therewith and with a pawl connected to the scraper and engaging a ratchet-wheel, and with a series of interruptions upon said ratchet-wheel, and with a bell-wire acted upon by said interruptions to intermittently ring the bell, substantially as specified.

In testimony whereof we have signed our names to this specification in the presence of two subscribing witnesses.

THEODOR BÖHM.
LEOPOLD EICHELBERG.

Witnesses:
  B. ROI,
  KRISSARD HANIEL.